US010270622B2

(12) United States Patent
Atreya et al.

(10) Patent No.: US 10,270,622 B2
(45) Date of Patent: Apr. 23, 2019

(54) METHOD FOR ENABLING MOBILITY OF CLIENT DEVICES IN LARGE SCALE UNIFIED NETWORKS

(75) Inventors: Vivek L. Atreya, Bangalore (IN); Shashi H. Ankaiah, Mandya (IN); Seemant Choudhary, Fremont, CA (US); Kumar Das Karunakaran, San Jose, CA (US); Udaya N. Shankar, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/775,816

(22) Filed: May 7, 2010

(65) Prior Publication Data
US 2010/0290446 A1 Nov. 18, 2010

Related U.S. Application Data

(60) Provisional application No. 61/178,283, filed on May 14, 2009.

(51) Int. Cl.
*H04W 28/00* (2009.01)
*H04L 12/46* (2006.01)
(Continued)

(52) U.S. Cl.
CPC ...... *H04L 12/4679* (2013.01); *H04L 12/4633* (2013.01); *H04W 8/08* (2013.01); *H04L 45/02* (2013.01); *H04L 2212/00* (2013.01)

(58) Field of Classification Search
CPC ..... H04L 12/4641; H04L 63/08; H04L 45/04; H04L 63/0869
(Continued)

(56) References Cited

U.S. PATENT DOCUMENTS 7,221,927 B2 5/2007 Kolar et al.
7,624,270 B2 * 11/2009 Pathan et al. ............... 713/171
(Continued)

FOREIGN PATENT DOCUMENTS

CN 101102188 A 1/2008
WO 2005079394 A2 9/2005
WO 2008011533 A2 1/2008

OTHER PUBLICATIONS

Cisco Systems, Inc., "Understanding VLAN Trunk Protocol (VTP)", published on Jul. 30, 2007.*
(Continued)

*Primary Examiner* — Asad M Nawaz
*Assistant Examiner* — Zhaohui Yang
(74) *Attorney, Agent, or Firm* — Stevens & Showalter, LLP (57) ABSTRACT

Embodiments herein include systems and methods for providing a mechanism to enable smooth, seamless, and reliable connectivity for wireless devices in a unified network. The system supports roaming of mobile units across mobility switches. A given mobile unit can retain its IP address in both intra-subnet and inter-subnet roaming scenarios. The given mobile unit also retains its membership to a mobility VLAN to which it had been assigned, even during roaming scenarios. Embodiments include a framework for wireless switches to advertise VLANs they support to peer wireless switches in the mobility domain, and to advertise their capability to act as VLAN servers for those VLANs. Embodiments support VLAN membership management capabilities that allow access points and peer wireless switches to request wireless switches to add VLANs to the tunnels they share.

20 Claims, 6 Drawing Sheets

(51) Int. Cl.
*H04W 8/08* (2009.01)
*H04L 12/751* (2013.01)

(58) Field of Classification Search
USPC .................. 726/12; 370/328, 331, 321, 220
See application file for complete search history.

(56) References Cited

U.S. PATENT DOCUMENTS

| | | | |
|---|---|---|---|
| 7,680,086 | B2 | 3/2010 | Eglin |
| 8,155,125 | B1 | 4/2012 | Borgione et al. |
| 2004/0053601 | A1* | 3/2004 | Frank .................. G01S 5/0252 455/411 |
| 2005/0143065 | A1 | 6/2005 | Pathan et al. |
| 2007/0086398 | A1* | 4/2007 | Tiwari .......................... 370/338 |
| 2007/0211664 | A1 | 9/2007 | Oyama et al. |
| 2008/0002607 | A1* | 1/2008 | Nagarajan et al. .......... 370/328 |
| 2008/0013474 | A1 | 1/2008 | Nagarajan et al. |
| 2008/0013481 | A1* | 1/2008 | Simons et al. ............... 370/328 |
| 2008/0107077 | A1* | 5/2008 | Murphy ....................... 370/331 |
| 2008/0155252 | A1* | 6/2008 | Nambiar ....................... 713/153 |
| 2010/0228974 | A1* | 9/2010 | Watts et al. .................. 713/168 |

OTHER PUBLICATIONS

IEEE standard, "Virtual Bridged Local Area Networks", IEEE 802.1Q-2005, published on May 19, 2006, cover page and p. 1-2.*
Chinese First Office Action/Search Report, dated Dec. 4, 2013, 9 pages.
Cisco Systems, Inc., Understanding VLAN Trunk Protocol (VTP), Document ID 10558, 8 pages, Jul. 30, 2007.
Blanco Cardona, P.; European Search Report; EP Patent Application No. 10004961.8; dated Sep. 29, 2014; European Patent Office; The Hague, Netherlands.
Blanco Cardona, P.; First Examination Report in Europe; EP Patent Application No. 10004961.8; dated Sep. 29, 2014; European Patent Office; The Hague, Netherlands.
Ströbeck, Anders; Decision to Grant in Europe; European Patent Application No. 10004961.8; dated Jun. 22, 2017; European Patent Office; Rijswijk, Netherlands.
Chinese Search Report; Chinese Patent Application No. 201010182875X; filed on May 13, 2010; The State Intellectual Property Office of People's Republic of China.
Chinese Supplemental Search Report; Chinese Patent Application No. 201010182875X; filed on May 13, 2010, The State Intellectual Property Office of People's Republic of China.
Second Office Action in China; Chinese Patent Application No. 201010182875X; filed on May 13, 2010, The State Intellectual Property Office of People's Republic of China.
Third Office Action in China; Chinese Patent Application No. 201010182875X; filed on May 13, 2010, The State Intellectual Property Office of People's Republic of China.
Fourth Office Action in China; Chinese Patent Application No. 201010182875X; filed on May 13, 2010, The State Intellectual Property Office of People's Republic of China.
Decision to Grant in China; Chinese Patent Application No. 201010182875X; filed on May 13, 2010, The State Intellectual Property Office of People's Republic of China.
Tsunoda, Shinji; First Office Action in Japan; Japanese Patent Application No. 2010-109861; dated Jan. 17, 2014; Japanese Patent Office.
Ito, Kazushige; Second Office Action in Japan; Japanese Patent Application No. 2010-109861; dated Dec. 4, 2014; Japanese Patent Office.
Ito, Kazushige; Decision to Grant in Japan; Japanese Patent Application No. 2010-109861; dated Apr. 15, 2015; Japanese Patent Office.
Enterasys: "Subnet Roaming with the RoamAbout Wireless Switch System" retrieved on Nov. 23, 2007 from <http://www.enterasys.com/company/literature/subnetroaming-roamabout-wp.pdf>.

* cited by examiner

METHOD FOR ENABLING MOBILITY OF CLIENT DEVICES IN LARGE SCALE UNIFIED NETWORKS

CROSS REFERENCE TO RELATED APPLICATIONS

The present application claims the benefit of U.S. Provisional Patent Application No. 61/178,283 filed on May 14, 2009, entitled "Method For Enabling Mobility Of Client Devices In Large Scale Unified Networks," which is incorporated herein by reference in its entirety.

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices. Certain computer networks can provide an environment in which both wired and wireless users are supported by a same set of network switches. Such an environment can be described as a unified network.

Computer networks can include various configurations. One such configuration, known as a local area network (LAN), provides network connectivity to a group of client computers. This group is typically small relative to other networks, and is often limited to a specific geographical area or network switch. A wireless local area network (WLAN) allows computing devices to move around within a local area and maintain network connectivity. A virtual local area network (VLAN) enables a group of client computers to communicate and access specific resources as members of a given broadcast domain even if the various member client computers are not attached to the same network switch.

SUMMARY

Conventional mechanisms for providing network connectivity to wireless devices in a large-scale unified network, such as layer 3 network, have challenges to enable smooth mobility of these wireless devices within a given mobility domain. The mobility domain includes mobility switches, which form a wireless data plane. The mobility switches, in a unified network, can include network switches that handle traffic for both wired and wireless devices. Such network switches can also act as a server for a particular VLAN that is accessible to both wired and wireless users. There are challenges associated with providing a VLAN to both wired and wireless devices, especially with networks that include two or more mobility switches. VLANs are typically based on membership, with a specific mobility switch acting as a VLAN server for a specific group of hosts. When a wireless computing device, also known as a mobile unit, which is a member of a particular VLAN roams from one mobile switch to another mobile switch, the mobile unit can lose connectivity to the VLAN, or at least lose reliable connectivity. Conventional mobile IP solutions, such as proxy mobile IP, have attempted to solve this problem. These solutions, however, can cause triangular routing and other security problems in the network. Another problem is that such mobile IP solutions mandate centralized deployments to solve multicast issues. An additional disadvantage is that only IP traffic is addressed, and a separate implementation is required to support IP version 4 and IP version 6.

Techniques disclosed herein include systems and methods for providing a mechanism to enable smooth, seamless, and reliable connectivity for wireless devices in a unified network. The system supports roaming of mobile units across mobility switches. A given mobile unit can retain its IP address in both intra-subnet and inter-subnet roaming scenarios. The given mobile unit also retains its membership to the mobility VLAN to which it had been assigned, even during roaming scenarios.

In one embodiment, a mobility agent acts to enable mobility of client devices. The mobility agent establishes a first mobility tunnel between a first mobility switch and a second mobility switch within a mobility domain. The mobility domain is typically a geographical region where a wireless system provides the same set of services for wireless network connectivity to mobile units. It consists of multiple mobility VLANs, each of which is an independent broadcast domain spanning across the full mobility domain. Mobile units can include any computing device having circuitry for wireless data communication. The first mobility switch and the second mobility switch are network switches that process data traffic from one or more mobile units. The first mobility tunnel functions as part of a data plane by providing a connection for wireless data traffic between the mobility switches. The mobility tunnel also acts as a control channel for exchanging control messaging. The mobility agent exchanges advertisements between the first mobility switch and the second mobility switch via the first mobility tunnel. The advertisements identify mobility Virtual Local Area Networks (VLANs) for which each respective mobility switch acts as a mobility VLAN server. The mobility VLAN server provides a specific VLAN to wireless users. The first mobility switch acts as a first mobility VLAN server for a first mobility VLAN.

The mobility agent receives a request to add the second mobility switch as a member of the first mobility VLAN. The mobility agent receives this request via the first mobility tunnel. The mobility agent also receives this request in response to a first mobile unit attempting to connect to the first mobility VLAN via the second mobility switch. This first mobile unit is a member of the first mobility VLAN. The mobility agent then adds the first mobility tunnel as a member of the first mobility VLAN to enable the second mobility switch to access the first mobility VLAN. The second mobility switch can then handle traffic to and from the mobile unit as part of the first mobility VLAN.

In another embodiment, the mobility agent establishes a first access tunnel between the first mobility switch and a first access point device. The first access point device has a network connection to the first mobility switch. The first access point device provides wireless network connectivity to one or more mobile units. For example, the access point device can include wireless transmission circuitry for relaying traffic between various mobile units and a given mobility switch. A connection between the access point device and a mobility switch can be either a wired or wireless connection. The mobility agent establishes a second access tunnel between the second mobility switch and a second access point device. The second access point device has a network connection to the second mobility switch. The second access point device provides wireless network connectivity to one or more mobile units within the mobility domain. The mobility agent then receives a request to add the second access point device as a member of the first mobility VLAN. The mobility agent receives this request via the second access tunnel. The mobility agent receives this request in response to the first mobile unit attempting to connect to the first mobility VLAN via the second access point device. Adding the first mobility tunnel and the second access tunnel as members of the first mobility VLAN enables the first mobile unit to retain an Internet Protocol address assigned to the first mobile unit as part of membership in the first mobility VLAN, even when the second mobility switch is part of a different subnet than the first mobility switch.

In another embodiment, the mobility agent receives a request from the second mobility switch to move or transfer the first mobility VLAN to the second mobility switch. The mobility agent receives this request in response to the first mobile unit attempting to connect to the first mobility VLAN via the second access point device. The mobility agent then causes the second mobility switch to act as the first mobility VLAN server. The first mobility VLAN can be either moved, so that the second mobility switch now acts as the first mobility VLAN server, or copied, so that both mobility switches now act as VLAN servers for the first mobility VLAN. Also, the VLAN server on the second mobility switch can be temporary or permanent.

Yet other embodiments herein include software programs to perform the steps and operations summarized above and disclosed in detail below. One such embodiment comprises a computer program product that has a computer-storage medium (e.g., a non-transitory, tangible computer readable storage media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: establishing a first mobility tunnel between a first mobility switch and a second mobility switch within a mobility domain, the mobility domain providing wireless network connectivity for mobile units, the first mobility switch and the second mobility switch being network switches that process data traffic from one or more mobile units, the first mobility tunnel providing a connection for control messaging between the mobility switches; exchanging advertisements between the first mobility switch and the second mobility switch via the first mobility tunnel, the advertisements identifying mobility Virtual Local Area Networks (VLANs) for which each respective mobility switch acts as a mobility VLAN server, the first mobility switch acting as a first mobility VLAN server for a first mobility VLAN; receiving a request to add the second mobility switch as a member of the first mobility VLAN, the request received via the first mobility tunnel in response to a first mobile unit attempting to connect to the first mobility VLAN via the second mobility switch, the first mobile unit being a member of the first mobility VLAN; and adding the first mobility tunnel as a member of the first mobility VLAN to enable the second mobility switch to access the first mobility VLAN. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting mobility of wireless devices across network switches. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for providing a mechanism to enable smooth, seamless, and reliable connectivity for wireless devices in a unified network. The system supports roaming of mobile units across mobility switches. A given mobile unit can retain its IP address in both intra-subnet and inter-subnet roaming scenarios. The given mobile unit also retains its membership to the mobility VLAN to which it had been assigned, even during roaming scenarios.

The mobility domain includes mobility switches that form a wireless data plane. The system supports roaming of mobile units across mobility switches. Each mobile unit can be assigned a mobility VLAN name and mobility VLAN identifier, with the scope of the mobility VLAN being valid in the mobility domain. The mobility VLAN is mapped to a local (static) VLAN on mobility switches. When a mobile unit roams to a switch on which a local mapping (association) for the mobility VLAN is not available, then packets need to be tunneled to a mobility switch that provides connectivity for the mobility VLAN. The system enables mobility switches in the mobility domain to be aware of the availability of mobility switches that provide service for various VLANs in the mobility domain.

A mobility VLAN management protocol and associated mobility agent provide a framework for wireless switches to advertise VLANs, that they support, to peer wireless switches in the mobility domain, and to advertise their capability to act as VLAN servers for various VLANs. Wireless switches refer to network switches structured or configured to handle traffic from wireless computing devices. The protocol also provides support for access points to request that the wireless switches add a particular VLAN to an access tunnel. The protocol supports VLAN membership management capabilities, which allow access points and peer wireless switches to request wireless switches to add VLANs to the tunnels that they share.

Figure 1:
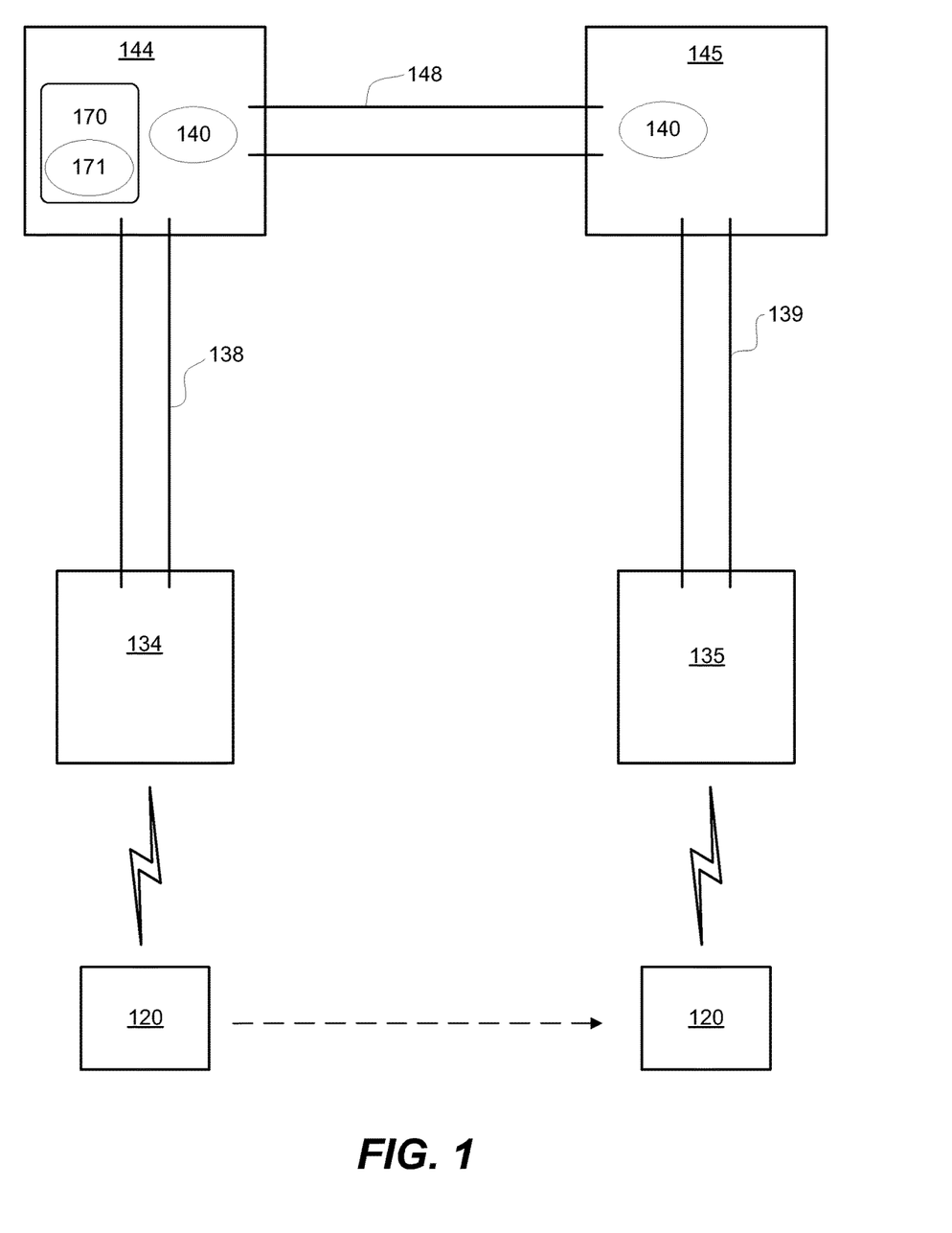
FIG. 1 is diagram of a portion of a unified network according to embodiments herein.

FIG. 1 illustrates a portion of an example wireless network system. The wireless network system consists of mobility switches 144 and 145, access point devices 134 and 135, and a mobile unit 120 that can roam between access points. A mobility tunnel 148 provides data connectivity between mobility switch 144 and mobility switch 145. Access tunnels 138 and 139 provide data connectivity between Access point 134 and mobility switch 144, and access point 135 and mobility switch 145 respectively. Mobile unit 120 can connect wirelessly to access point 134 or to access point 135 depending on a roaming location. Data packets or frames from mobile unit 120 will first reach access point 134. Access point 134 will pass received frames to mobility switch 144 through access tunnel 138. Access tunnel 138 is a secure tunnel port. Mobility switch 144 makes a packet forwarding decision. Mobility switch 144 inspects data packets to determine where to send the data packets based on a destination address.

There are two kinds of tunnel ports. One kind of tunnel port can exist between access points and mobility switches, and the other kind of tunnel port can exist between mobility switches. Any protocol can be used for establishing these tunnels. A tunnel protocols can be used to set up, maintain, and tear down tunnels in the data plane. Tunnel protocols can offer control and data packet transfer services to other layers in the system. A mobility VLAN management protocol can operate over a control channel offered by the tunnel protocol to provide VLAN management services on the access and mobility tunnels. Access tunnels can be set up and managed by an access tunnel protocol. The access tunnel protocol includes a client that resides on the access point, and a server that resides on the mobility switch. Likewise, the mobility tunnels can be set up and managed by a mobility tunnel protocol using client and server components residing on mobility switches.

Tunnel protocols can be based on client/server architecture. The client component can initiate session proceedings (tunnel setup) by sending a join request to the server. The server can either accept or reject the join request, by indicating this in a join response. If the server accepts the join request, then the server signals this acceptance in the join response, and the tunnel moves to an established state. Once the tunnel is established, then either the client or server and can initiate transactions and notifications. Whichever endpoint that initiates a transaction assumes the role of a client for that transaction, and the endpoint which received the transaction request assumes the role of the server for that particular transaction. Either the client or the server can send single notification messages. The tunnel client is responsible for maintaining freshness of the tunnel by periodically initiating a keep alive transaction. When either the client or server endpoint wants to end or tear down the tunnel, the endpoint executes this by initiating a leave transaction. The leave transaction completes when the endpoint receiving the leave request responds with a leave response.

Peer mobility switches in a given mobility domain share a mobility tunnel. Once the mobility switch discovers a peer mobility switch, the mobility switch determines a role (client/server) that it will play in the tunnel protocol. In one example, the mobility switch with a lesser IP address can assume the role of the client while the peer mobility switch assumes the role of a server.

In the mobility domain, data frames can belong to a different network, such as VLAN. In a normal situation, such as when mobile unit 120 associates to access point 134, mobile unit 120 will need to authenticate with the mobility domain. When mobile unit 120 authenticates with the mobility network, the mobile unit 120 acquires access to a corresponding VLAN (170), as a wireless controller will pass the relevant VLAN information to access point 134. The wireless controller is shown and described in more detail in FIG. 5. The access point 134 will request mobility switch 144 to gain access to VLAN 170. This is to acquire VLAN membership on access tunnel port 138. In response to this request, mobility agent 140 can add mobility tunnel 138 to VLAN 170 to enable mobile unit 120 to access VLAN 170.

Each mobility switch can be configured to act as a VLAN server for one or more VLANs. Each mobility switch in the mobility domain, that is the mobility switches that provide mobility to VLANs, can also advertise their capability through mobility agents. Each mobility switch that does not provide connectivity to advertised mobility VLANs, can consume advertisements and record this information so that whenever a mobile unit attaches to a mobility switch that is not providing connectivity to the given VLAN, then that given mobility switch can contact a peer mobility switch that provides connectivity to the given VLAN. In other words, mobility switches that provide connectivity to VLANs can advertise their capability as VLAN servers, and mobility switches that do not provide connectivity to VLANs can record these advertisements and subsequently acquire membership to the VLAN servers to provide connectivity. Mobility switches can advertise a subset of VLANs to other mobility switches so that each mobility switch both sends and receives advertisements.

For example, mobility switch 144 provides connectivity to VLAN 170. Mobility switch 144 advertises this connectivity to mobility switch 145, and to any other mobility switches within the mobility domain. Mobility switch 145, which is not providing connectivity to VLAN 170 will mark mobility switch 144 as VLAN server 171 for VLAN 170. In this example, mobile unit 120 is a member of the VLAN 170. When mobile unit 120 roams to mobility switch 145, connectivity to VLAN 170 is initially absent. In response, mobility switch 145 passes frames to mobility switch 144 because mobility switch 144 is the VLAN server 170. With no configuration change, VLAN 170 will remain at mobility switch 144 while being accessible via mobility switch 145. In other example embodiments VLAN 170 can be moved to mobility switch 145, or to another given mobility switch. In other words, a user or administrator can move a given VLAN server to a different mobility switch as desired. In other embodiments, several mobility switches can act as a VLAN server for a given VLAN.

Mobility tunnel 148 provides a communication channel between mobility switches 144 and 145 for the control exchange to advertise and to establish memberships. In example embodiment FIG. 1, there are two a mobility switches with one mobility tunnel connecting the mobility switches. By way of another non-limiting example, a given mobility domain or wireless system might have a few, or dozens, or hundreds of mobility switches. Each mobility switch can create multiple mobility tunnels to create a communication channel with other mobility switches within a given mobility domain. These mobility tunnels can be maintained continually similar to virtual wires between mobility switches. Mobility agents on each of the mobility switches can then change membership of those tunnels to specific VLANs according to requests from other mobility switches.

Advertising VLANs supported by mobility switches can be a continual process. Mobility agent 140 can publish VLAN mappings to a VLAN advertisement area, such as a group of mobility switches or other subset of a mobility domain. Mobility agent 140 can subsequently publish modifications to existing VLAN associations, removals of existing associations, and addition of new VLAN associations. Mobility switches can follow a periodic full update model for sending advertisements to peer mobility switches. Such an advertisement would contain a full list of supported VLANs sent out at a specific interval. Alternatively, advertisements can be sent as changes relative to a previous advertisement transmission.

In another example embodiment mobility switch 144 might act as a VLAN server for multiple different VLANs. In this example, and in response to a request for permission to access one of the multiple VLANs, mobility switch 144 can add the corresponding mobility tunnel to the requested VLAN, and then return a message response indicating that the requesting clients or requesting mobility switches are now a member of the requested VLAN. Thus, the mobility agent manages port membership of VLANs, and creates a virtual extension of VLAN 170. This virtual extension of VLAN 170 can extend to a dynamically created temporary VLAN on mobility switch 145, thus allowing mobile unit 120 to access VLAN 170. Mobility switch 145 can then process data traffic locally for roaming mobile units.

Mobility VLANs can function to manage access to resources for particular groups of client devices or users. Accordingly, a wireless controller can receive instructions that a particular user needs to be assigned to a particular mobility VLAN. This can provide logical and practical benefits. For example, an engineering user may be assigned to an engineering VLAN, while a financial user may be signed to a financial VLAN, wherein both users can be part of a same organization. In another example, VLANs can be segregated by building number, or by particular users. VLANs can provide various levels of control, security, and access. In another example, a restricted access VLAN can be assigned to guest users. After creating VLAN assignments, mobility agents operate to keep a given user in an assigned VLAN wherever the user roams.

In a unified network, the mobility network typically needs to be bridged to a wired network. For such bridging, mobility VLANs need to be mapped to a local VLAN. Wireless network and mobility agents function to manage roaming of wireless clients, so that irrespective of which access point to which a client roams, traffic from that client can be forwarded to the switch or switches where a corresponding mobility VLAN is mapped to a local or static VLAN.

Functionality supported by the wireless system and, more particularly, functionality associated with mobility agent 140 will now be discussed via flowcharts and illustrations in FIG. 2 through FIG. 5. For purposes of the following discussion, the mobility agent 140 or other appropriate entity performs steps in the flowcharts.

Figure 2:
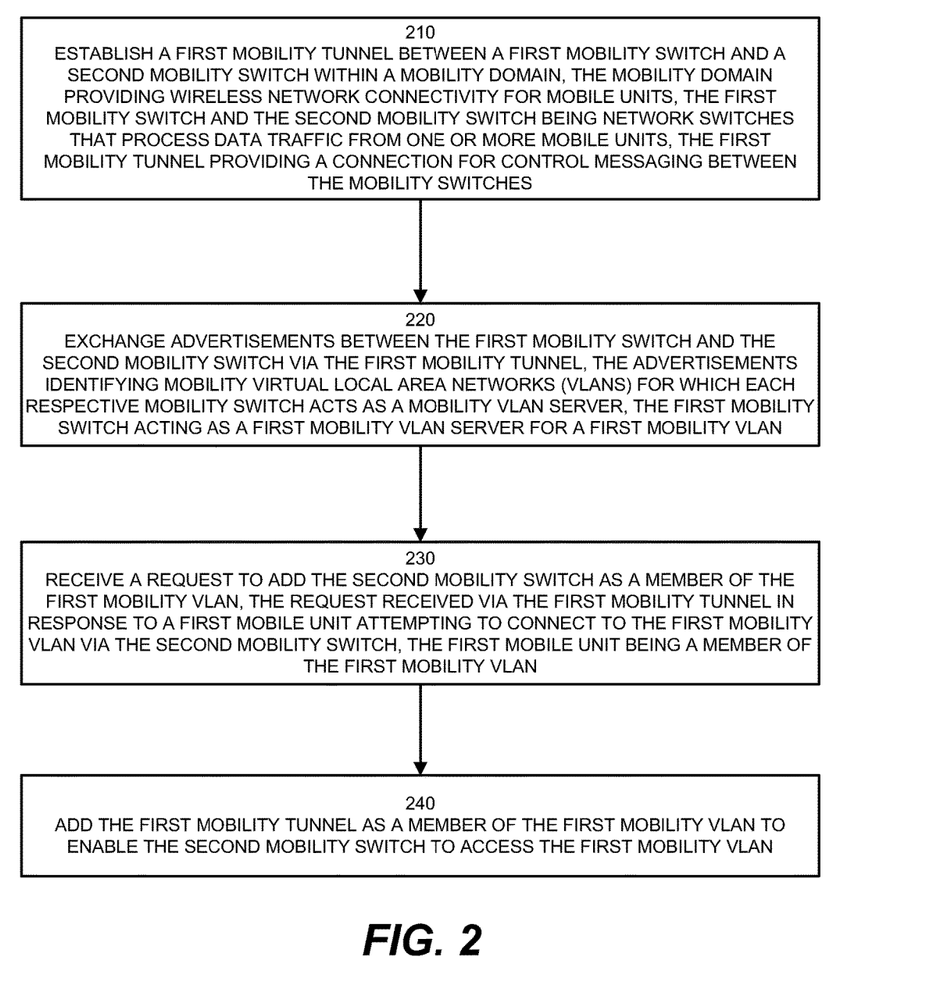
FIG. 2 is a flowchart illustrating an example of a mobility agent process according to embodiments herein.

Now describing embodiments more specifically, FIG. 2 is a flow chart illustrating embodiments disclosed herein. In step 210, mobility agent 140 establishes a first mobility tunnel 148 between a first mobility switch 144 and a second mobility switch 145 within a mobility domain. The mobility domain provides wireless network connectivity for mobile units. Mobile units can include a computing device having wireless network connection capability. For example, mobile units can include laptop computers, netbooks, cell phones, PDAs, and so forth. The first mobility switch 144 and the second mobility switch 145 are network switches that process data traffic from one or more mobile units. The first mobility tunnel 148 provides a connection for control messaging and data traffic between the mobility switches.

In step 220, mobility agent 140 exchanges advertisements between the first mobility switch 144 and the second mobility switch 145 via the first mobility tunnel 148. The exchanged advertisements identify mobility virtual local area networks (VLANs) for which each respective mobility switch acts as a mobility VLAN server. Mobility VLANs refers to VLANs that provide membership to some wireless users or wireless computing devices. The first mobility switch 144 acts as a first mobility VLAN server 171 for a first mobility VLAN 170.

In step 230, mobility agent 140 receives a request to add the second mobility switch 145 as a member of the first mobility VLAN 170. Mobility agent 140 receives this request via the first mobility tunnel 148 in response to a first mobile unit 120 attempting to connect to the first mobility VLAN 170 via the second mobility switch 145. The first mobile unit 120 is a member of the first mobility VLAN 170.

In step 240, mobility agent 140 adds the first mobility tunnel 148 as a member of the first mobility VLAN 170 to enable the second mobility switch 145 to access the first mobility VLAN 170, thereby enabling seamless mobility within the mobility domain.

Figure 3:
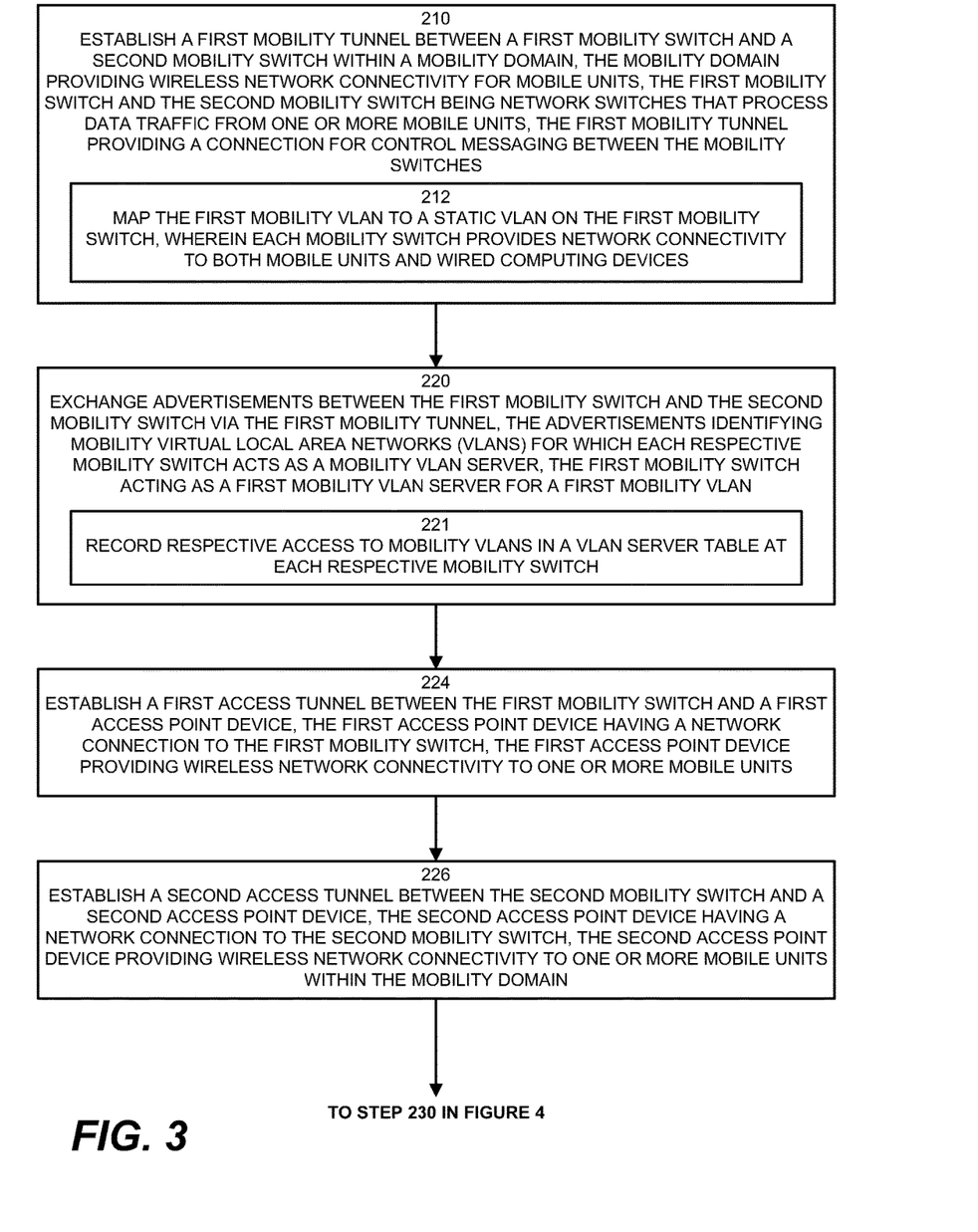
FIGS. 3-4 are a flowchart illustrating an example of a mobility agent process according to embodiments herein.
Figure 4:
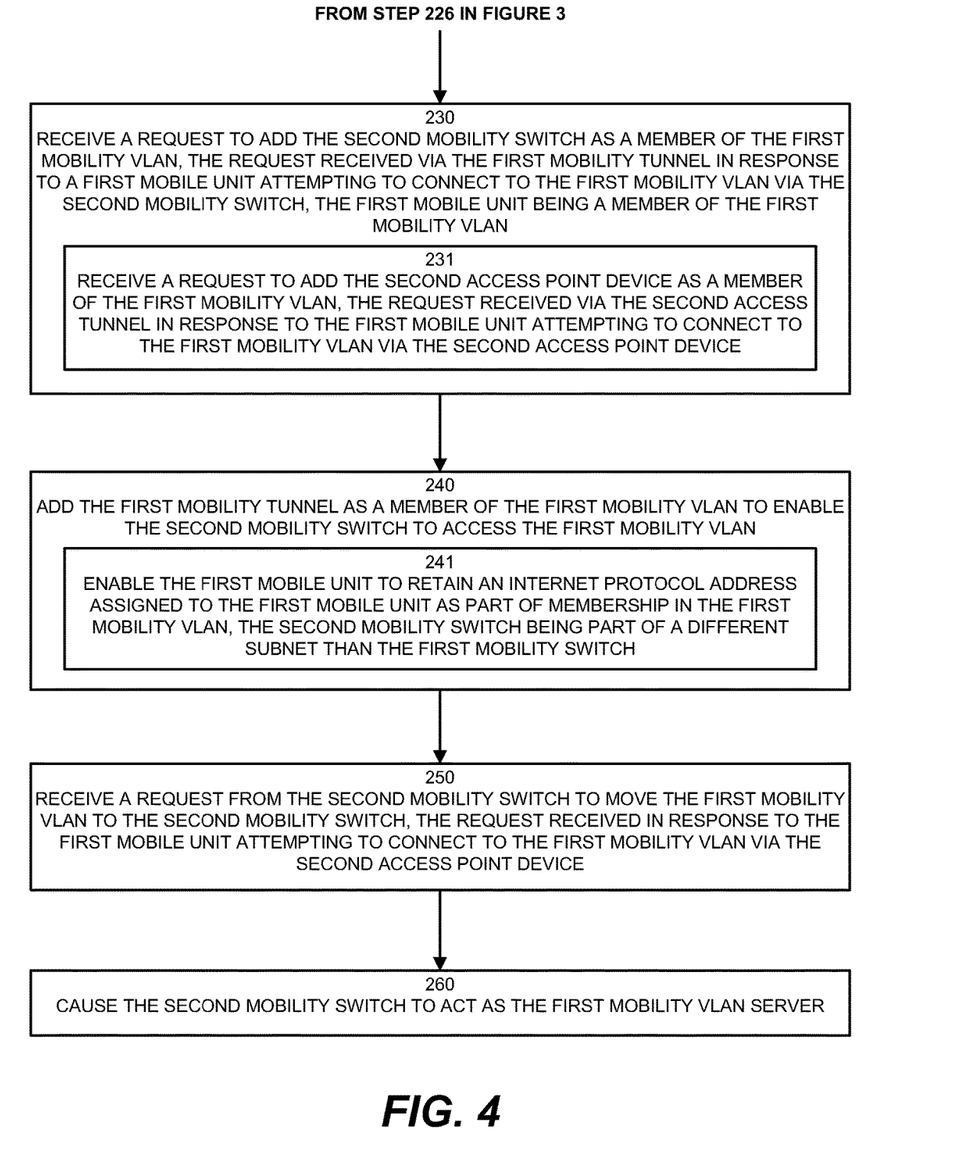

FIGS. 3 and 4 expand on the flowchart of FIG. 2 by providing additional features and functionality.

In step 210, mobility agent 140 establishes a first mobility tunnel 148 between a first mobility switch 144 and a second mobility switch 145 within a mobility domain. The mobility domain provides wireless network connectivity for mobile units. The first mobility switch 144 and the second mobility switch 145 are network switches that process data traffic from one or more mobile units. The first mobility tunnel 148 provides a connection for control messaging and data traffic between the mobility switches.

In step 212, mobility agent 140 maps the first mobility VLAN 170 to a static VLAN on the first mobility switch 144. In this case, each mobility switch provides network connectivity to both mobile units and wired computing devices. In other words, this network switch is unified in that the switch provides a mobility network to both types of devices.

In step 220, mobility agent 140 exchanges advertisements between the first mobility switch 144 and the second mobility switch 145 via the first mobility tunnel 148. The exchanged advertisements identify mobility virtual local area networks (VLANs) for which each respective mobility switch acts as a mobility VLAN server. Mobility VLANs refers to VLANs that provide membership to at least one or more wireless users or wireless computing devices. The first mobility switch 144 acts as a first mobility VLAN server 171 for a first mobility VLAN 170.

In step 221, mobility agent 140 records respective access to mobility VLANs in a VLAN server table at each respective mobility switch.

In step 224, mobility agent 140 establishes a first access tunnel 138 between the first mobility switch 144 and a first access point device 134. The first access point device 134 has a network connection to the first mobility switch 144. The first access point device 134 provides wireless network connectivity to one or more mobile units.

In step 226, mobility agent 140 establishes a second access tunnel 139 between the second mobility switch 145 and a second access point device 135. The second access point device 135 has a network connection to the second mobility switch 145. The second access point device 135 provides wireless network connectivity to one or more mobile units 120 within the mobility domain.

In step 230, mobility agent 140 receives a request to add the second mobility switch 145 as a member of the first mobility VLAN 170. Mobility agent 140 receives this request via the first mobility tunnel 148 in response to a first mobile unit 120 attempting to connect to the first mobility VLAN 170 via the second mobility switch 145. The first mobile unit 120 is a member of the first mobility VLAN 170.

In step 231 mobility agent 140 receives a request to add the second access point device 135 as a member of the first mobility VLAN 170. The mobility agent 140 receives this request via the second access tunnel 135 in response to the first mobile unit attempting to connect to the first mobility VLAN 170 via the second access point device. The mobility agent 140 can receive this request before receiving the request to add the second mobility switch 145 as a member of the first mobility VLAN 170

In step 240, mobility agent 140 adds the first mobility tunnel 148 as a member of the first mobility VLAN 170 to enable the second mobility switch 145 to access the first mobility VLAN 170, thereby enabling seamless mobility within the mobility domain.

In step 241, mobility agent 140 enables the first mobile unit 120 to retain an Internet protocol address assigned to the first mobile unit 120 as part of membership in the first mobility VLAN 170.

In step 250, mobility agent 140 receives a request from the second mobility switch 145 to move the first mobility VLAN 170 to the second mobility switch 145. Mobility agent 140 receives this request in response to the first mobile unit 120 attempting to connect to the first mobility VLAN 170 via the second access point device 135.

In step 260, mobility agent 140 causes the second mobility switch 145 to act as the first mobility VLAN server 171.

In another embodiment, mobility agent 140 load balances a number of mobility VLANs assigned to each mobility switch based a computing load that each mobility switch can support. Such load balancing can be based on an amount of client computing devices that each mobility switch can support and/or an amount of traffic being processed. Different network switches have different capacities with respect to the number of users that each network switch can support Embodiments also support roaming across mobility domains. A wireless network can include at least two distinct mobility domains. With two distinct domains, mobility agent 140 exchanges advertisements between mobility switches across the two distinct mobility domains to provide access across the two distinct mobility domains to the first mobility VLAN 170 while selectively preventing access to other mobility VLANs across the two distinct mobility domains. For example, a large academic campus might be divided into several separate mobility domains. In this example campus, a particular VLAN for a group of students might not allow roaming, or seamless roaming, to other parts of the campus, while a VLAN that includes membership for administrative staff and professors might enable seamless roaming across the entire campus. In such an example scenario, mobility agent 140 can proxy VLAN servers across domains. Mobility agent 140 can select specific VLANs that are permitted to be proxied, while restricting other VLANs.

Figure 5:
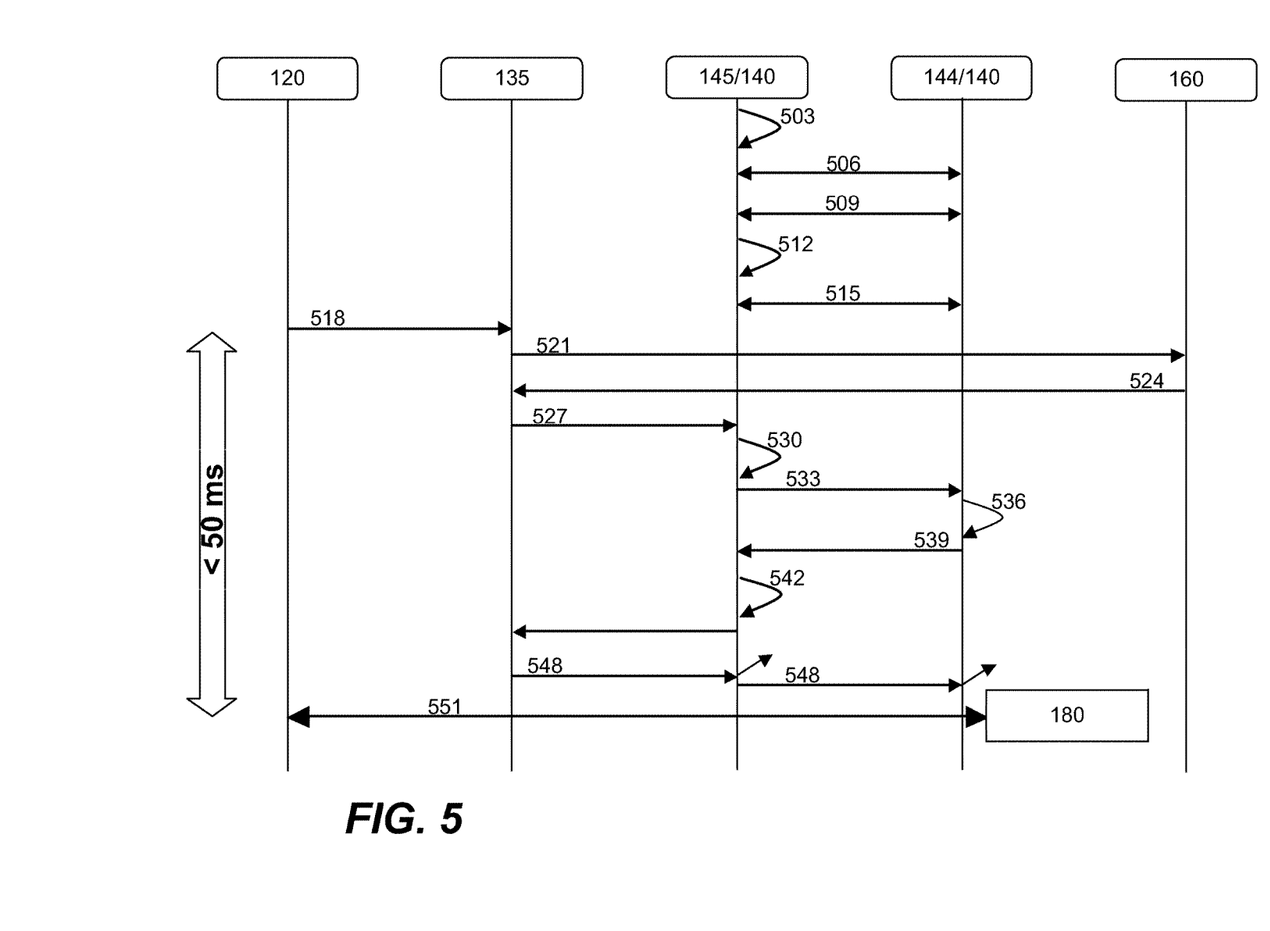
FIG. 5 is a flowchart illustrating an example of a mobility agent process according to embodiments herein.

FIG. 5 includes a flow chart that illustrates an example process flow of mobility VLAN management within a wireless system. FIG. 5 focuses on the protocol between two or more mobility agents, and between a mobility agent and an access point. The mobility VLAN management protocol can run on top of both the mobility tunnels and the access tunnels. Across access tunnels, that is, between an access point and a mobility switch, control messaging primarily focuses on membership management of VLANs. Across mobility tunnels, that is between/among mobility agents, the protocol focuses on both membership management and on advertisements.

The mobility domain can include several entities including mobile unit 120, access point 135, mobility switch/mobility agent 145/140, peer mobility switch/mobility agent 144/140, and wireless control plane 160, which is also known as a mobility controller.

At step 503, mobility agent 140 initializes. At step 506, mobility switch 145 establishes a mobility tunnel with peer mobility switch 144, and then in step 509 the mobility switches exchange advertisements indicating whichever VLAN servers are on each respective mobility switch. In step 512, based on those advertisements, mobility agent 140 builds a VLAN server table in mobility switch 145. This enables each mobility switch to know which peer mobility switch has access to which specific VLANs. In step 515, mobility agents maintain mobility tunnels using keep alive packets to keep the mobility tunnel connection live as if it were a physical link. Keep alive packets can be control packets periodically transmitted across the mobility tunnel.

In step 518, mobile unit 120 associates access point 135 using an associate message. In step 521, access point 135 communicates directly to wireless controller 160 to authenticate mobile unit 120. By way of a non-limiting example, the wireless controller 160 can include Remote Authentication Dial In User Service (RADIUS) as an authentication protocol. Step 521 is also used to establish access authorizations of mobile unit 120. In step 524, wireless control plane 160 accesses the authentication request for mobile unit 120, and can indicate that the mobile unit client is a member of a particular VLAN, and provide a mobility VLAN identification. The mobility VLAN identification maps a mobility VLAN name to a unique ID within the mobility domain. Configured VLAN names are mapped to VLAN IDs in an address space. A VLAN address space is used to map the VLAN name to a VLAN number, and this number is passed back to access point 135.

In step 527, access point 135 seeks a mobility switch that already has access to a particular VLAN requested or designated for mobile unit 120. If mobile unit 120 is new to a particular access point that does not have access to the particular VLAN, then access point 135 sends an add VLAN request to the mobility switch 145 and includes the mobility VLAN ID in this request. This request can be transmitted as a VLAN membership management message. In step 530 mobility switch 145 attempts to make a VLAN server election based on the VLAN ID by looking in the server table to determine if the particular VLAN is available locally or on a remote mobility switch. In this example, mobility agent 140 determines that a particular VLAN is available on peer mobility switch 144, and mobility switch 145 does not currently have access to the requested VLAN.

In step 533, mobility switch 145 sends an add VLAN request to peer mobility switch 144. In step 536, a mobility switch 144 examines its server table and determines that mobility switch 144 includes local access to the requested VLAN. In step 539 mobility agent 140 adds the mobility tunnel, to which the request was received, to the particular VLAN that is locally present. For example, mobility agent 140 can add to a membership list or modify a VLAN membership table, and send a return message back through the same mobility tunnel. In step 542, mobility switch 145 creates a remote VLAN, which is a temporary VLAN created dynamically by the mobility switch 145. Mobility switch 145 also connects the access tunnel and the mobility tunnel to that temporary VLAN. In step 545, mobility switch 145 sends a VLAN membership added message to access point 135.

In some embodiments, step 527 through step 545 can be executed once per VLAN. Thus, if another client comes to a same employee VLAN on a same access point, then the access point simply increases or increments a reference count at the access point without having to propagate associate messages to the mobility switches or wireless controller. Subsequent accesses by members of the particular VLAN are then managed locally at the access point. Mobility switch 145 can also execute a similar reference counting when a different access point requests membership for a same VLAN without actually sending a corresponding request to the remote switch 144, similar to how an access point reference counts.

In some embodiments, the time duration from the point of sending associate message to a point at which a client can actually start sending traffic, can be less than about 50 milliseconds. Once memberships are established, access points can function by transmitting a learning frame through tunnels (step 548) using various protocols such as Gratuitous Address Resolution Protocol (GARP). Such a learning frame can inform mobility switches that a particular client MAC address is available on specific VLAN ports, special ports, and physical ports, and can also identify a mapping of the mobility VLAN to a static VLAN. This helps ensure that data traffic reaches a correct switch so that in step 551, data packets can be exchanged between mobile unit 120 and a corresponding node 180.

If mobile unit 120 roams to a different mobility switch and different access points, then the association process will repeat. In this roaming example, the access point will first look to access the particular VLAN. If this new access point already has access to the new VLAN, then this access point simply increments the counter, otherwise, the process of FIG. 5 is repeated.

In some embodiments, a mobile client or the wireless controller, on behalf of a wireless client, may execute a "pre-authentication" process with an access point ahead of an actual association process to minimize roaming delay. In such cases, the access point 135 can trigger the process of FIG. 5 in response to such a pre authentication process such that when the mobile unit actually associates, the VLAN membership is pre-established with the remote switch 144.

In yet another embodiment, mobility agent 140 can act to teardown or otherwise remove VLAN memberships. Mobility agent 140 can remove VLAN memberships under various conditions. For example, if an access point detects that a certain accessible VLAN is no longer being used by any associated client for a specified amount of time (idle time), then the access point can determine to release membership to the VLAN by sending a VLAN Membership Management remove request to mobility switch 145. Similarly, when remote mobility switch 145 detects that a dynamically created mobility VLAN is no longer a member of any access tunnels for a specified amount of time (idle time), then mobility agent 140 can release membership to the VLAN by sending a VLAN Membership Management remove request to VLAN server mobility switch (144). In another condition, when an access tunnel or mobility tunnel is deleted, a mobility switch can remove VLAN memberships. When a mobility VLAN is deleted, all mobility switches can remove memberships and send messages to access points through access tunnels to notify of a lost VLAN membership. When an administrator removes a given VLAN server configuration on mobility switch 144, then mobility agent 140 can send a notification to peer switches 145 indicating a corresponding lost membership. Also, when there are multiple VLAN servers for a same VLAN, remote mobility switch 145 can choose to move from one VLAN server to another by releasing membership with one mobility switch and requesting membership to another mobility switch.

Figure 6:
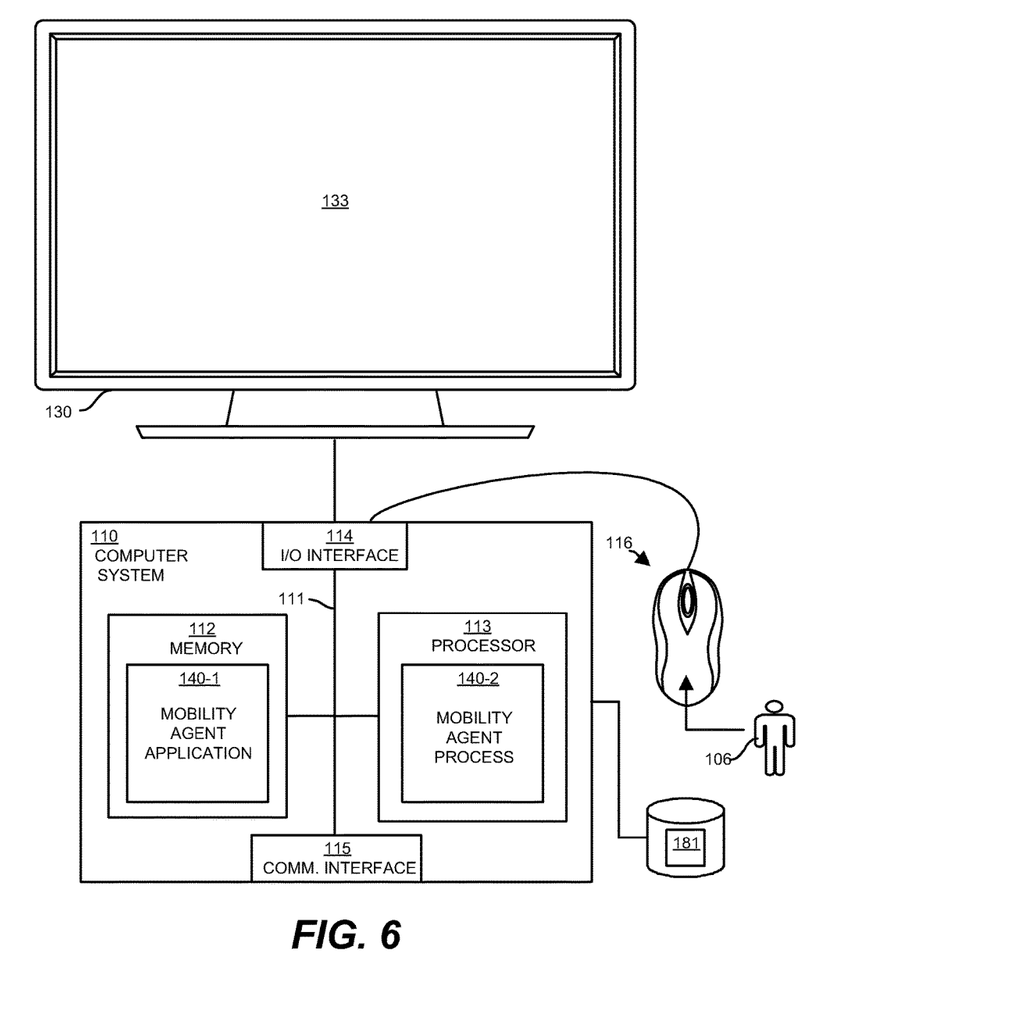
FIG. 6 is an example block diagram of a mobility agent operating in a computer/network environment according to embodiments herein.

FIG. 6 shows an example physical embodiment according to techniques disclosed herein. In FIG. 6, computer system 110 is shown connected to display monitor 130 for displaying a graphical user interface 133 for a user 106 to use a mobility agent 140 for processing data using input devices 116. In some embodiments, computer system 110 can execute mobility agent 140 independent of user input, or in response to various inputs. Repository 181 can optionally be used for storing client data both before and after processing. Input devices 116 can include one or more devices such as a keyboard, computer mouse, etc.

Note that the following discussion provides a basic embodiment indicating how to carry out functionality associated with the mobility agent 140 as discussed above and below. It should be noted, however, that the actual configuration for carrying out the mobility agent 140 can vary depending on a respective application. For example, as previously discussed, computer system 110 can include one or multiple computers that carry out the processing as described herein.

In different embodiments, computer system 110 may be any of various types of devices, including, but not limited to, a network switch, a router, a wireless access point, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the mobility agent 140 of computer system 110 to communicate over a network and, if necessary, retrieve any data required to create views, process content, communicate with a user, etc. according to embodiments herein.

As shown, memory system 112 is encoded with mobility agent 140-1 that supports functionality as discussed above and as discussed further below. Mobility agent 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the mobility agent 140-1. Execution of the mobility agent 140-1 produces processing functionality in mobility agent process 140-2. In other words, the mobility agent process 140-2 represents one or more portions of the mobility agent 140 performing within or upon the processor 113 in the computer system 110.

It should be noted that, in addition to the mobility agent process 140-2 that carries out method operations as discussed herein, other embodiments herein include the mobility agent 140-1 itself (i.e., the un-executed or non-performing logic instructions and/or data). The mobility agent 140-1 may be stored on a tangible computer readable storage medium including computer readable storage media such as floppy disk, hard disk, optical medium, etc. According to other embodiments, the mobility agent 140-1 can also be stored in a memory type system such as in firmware, read only memory (ROM), or, as in this example, as executable code within the memory system 112.

In addition to these embodiments, it should also be noted that other embodiments herein include the execution of the mobility agent 140-1 in processor 113 as the mobility agent process 140-2. Thus, those skilled in the art will understand that the computer system 110 can include other processes and/or software and hardware components, such as an operating system that controls allocation and use of hardware resources, or multiple processors.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
    establishing, by a mobility agent, a first mobility tunnel between a first mobility switch and a second mobility switch within a mobility domain, the mobility domain providing connectivity over a wireless network for mobile units, the first mobility switch and the second mobility switch being network switches that process data traffic from one or more mobile units, the first mobility tunnel providing a connection for control messaging between the first and second mobility switches;
    exchanging, by the mobility agent, advertisements between the first mobility switch and the second mobility switch via the first mobility tunnel, the advertisements identifying mobility Virtual Local Area Networks (VLANs) for which each respective mobility switch acts as a mobility VLAN server, the first mobility switch acting as a first mobility VLAN server for a first mobility VLAN;
    establishing, by the mobility agent, a first access tunnel between the first mobility switch and a first access point device, the first access point device having a network connection to the first mobility switch, the first access point device providing wireless network connectivity to one or more mobile units;
    establishing, by the mobility agent, a second access tunnel between the second mobility switch and a second access point device, the second access point device having a network connection to the second mobility switch, the second access point device providing wireless network connectivity to one or more mobile units within the mobility domain;
    receiving, by the mobility agent, a request to add the second mobility switch as a member of the first mobility VLAN, the request received via the first mobility tunnel in response to a first mobile unit attempting to connect to the first mobility VLAN via the second mobility switch, the first mobile unit being a member of the first mobility VLAN;
    receiving, by the mobility agent, a request to add the second access point device as a member of the first mobility VLAN, the request received via the second access tunnel in response to the first mobile unit attempting to connect to the first mobility VLAN via the second access point device; and
    adding, by the mobility agent, the first mobility tunnel as a member of the first mobility VLAN to enable the second mobility switch to access the first mobility VLAN in order to handle traffic to and from the first mobile unit as part of the first mobility VLAN.

2. The computer-implemented method of claim 1, wherein adding the first mobility tunnel as a member of the first mobility VLAN enables the first mobile unit to retain an Internet Protocol (IP) address assigned to the first mobile unit as part of membership in the first mobility VLAN, the second mobility switch being part of a different subnet than the first mobility switch.

3. The computer-implemented method of claim 1, further comprising:
    receiving, by the mobility agent, a request from the second mobility switch to move the first mobility VLAN to the second mobility switch, the request received in response to the first mobile unit attempting to connect to the first mobility VLAN via the second access point device; and causing, by the mobility agent, the second mobility switch to act as the first mobility VLAN server.

4. The computer-implemented method of claim 1, wherein exchanging advertisements between the first mobility switch and the second mobility switch includes recording respective access to mobility VLANs in a VLAN server table at each respective mobility switch.

5. The computer-implemented method of claim 1, wherein the mobility domain providing wireless network connectivity for mobile units includes the first mobility VLAN being mapped to a static VLAN on the first mobility switch, wherein each mobility switch provides network connectivity to both mobile units and wired computing devices.

6. The computer-implemented method of claim 5, further comprising:
load balancing, by the mobility agent, a number of mobility VLANs assigned to each mobility switch based on a computing load that each mobility switch can support.

7. The computer-implemented method of claim 1, wherein the wireless network further comprises at least two distinct mobility domains, the method further comprising:
exchanging, by the mobility agent, advertisements between mobility switches across the two distinct mobility domains to provide access across the two distinct mobility domains to the first mobility VLAN while selectively preventing access to other mobility VLANs across the two distinct mobility domains, wherein the first mobile unit retains an IP address assigned to the first mobile unit as part of its membership in the first mobility VLAN in both intra-subnet and inter-subnet roaming scenarios.

8. The method of claim 1, wherein the requests to add the second mobility switch and the second access point device as members of the first mobility VLAN each comprise a first mobility VLAN identifier and a requested action, the method further comprising:
receiving, by the mobility agent, a first response indicating acceptance of the request to add the second mobility switch as a member of the first mobility VLAN, wherein the first response comprises the first mobility VLAN identifier and a result code.

9. The method of claim 8, further comprising:
receiving, by the mobility agent, a second response indicating acceptance of the request to add the second access point as a member of the first mobility VLAN, wherein the second response comprises the first mobility VLAN identifier and a second result code; and
adding, by the mobility agent, the second access tunnel as a member of the first mobility VLAN, wherein adding the first mobility tunnel and the second access tunnel as members of the first mobility VLAN enables the first mobile unit to retain an IP address assigned to the first mobile unit as part of membership in the first mobility VLAN, the second mobility switch being part of a different subnet than the first mobility switch.

10. A computer system comprising:
a memory;
a processor;
a communications interface;
an interconnection mechanism coupling the memory, the processor and the communications interface, the memory storing instructions to carry out functionality of a mobility agent that, when executed by the processor, cause the system to perform the operations of:
establishing a first mobility tunnel between a first mobility switch and a second mobility switch within a mobility domain, the mobility domain providing connectivity over a wireless network for mobile units, the first mobility switch and the second mobility switch being network switches that process data traffic from one or more mobile units, the first mobility tunnel providing a connection for control messaging between the first and second mobility switches;
exchanging advertisements between the first mobility switch and the second mobility switch via the first mobility tunnel, the advertisements identifying mobility Virtual Local Area Networks (VLANs) for which each respective mobility switch acts as a mobility VLAN server, the first mobility switch acting as a first mobility VLAN server for a first mobility VLAN;
establishing a first access tunnel between the first mobility switch and a first access point device, the first access point device having a network connection to the first mobility switch, the first access point device providing wireless network connectivity to one or more mobile units;
establishing a second access tunnel between the second mobility switch and a second access point device, the second access point device having a network connection to the second mobility switch, the second access point device providing wireless network connectivity to one or more mobile units within the mobility domain;
receiving a request to add the second mobility switch as a member of the first mobility VLAN, the request received via the first mobility tunnel in response to a first mobile unit attempting to connect to the first mobility VLAN via the second mobility switch, the first mobile unit being a member of the first mobility VLAN;
receiving a request to add the second access point device as a member of the first mobility VLAN, the request received via the second access tunnel in response to the first mobile unit attempting to connect to the first mobility VLAN via the second access point device; and
adding the first mobility tunnel as a member of the first mobility VLAN to enable the second mobility switch to access the first mobility VLAN in order to handle traffic to and from the first mobile unit as part of the first mobility VLAN.

11. The computer system of claim 10, wherein adding the first mobility tunnel as a member of the first mobility VLAN enables the first mobile unit to retain an Internet Protocol (IP) address assigned to the first mobile unit as part of membership in the first mobility VLAN, the second mobility switch being part of a different subnet than the first mobility switch.

12. The computer system of claim 10, wherein the memory stores further instructions that when executed by the processor cause the system to perform the operations of:
receiving a request from the second mobility switch to move the first mobility VLAN to the second mobility switch, the request received in response to the first mobile unit attempting to connect to the first mobility VLAN via the second access point device; and
causing the second mobility switch to act as the first mobility VLAN server.

13. The computer system of claim 10, wherein exchanging advertisements between the first mobility switch and the second mobility switch includes recording respective access to mobility VLANs in a VLAN server table at each respective mobility switch.

14. The computer system of claim 10, wherein the mobility domain providing wireless network connectivity for mobile units includes the first mobility VLAN being mapped to a static VLAN on the first mobility switch, wherein each mobility switch provides network connectivity to both mobile units and wired computing devices.

15. The computer system of claim 14, wherein the memory stores further instructions that when executed by the processor cause the system to perform the operation of:
load balancing a number of mobility VLANs assigned to each mobility switch based on a computing load that each mobility switch can support.

16. The computer system of claim 10, wherein the wireless network further comprises at least two distinct mobility domains and wherein the memory stores further instructions that when executed by the processor cause the system to perform the operation of:
exchanging advertisements between mobility switches across the two distinct mobility domains to provide access across the two distinct mobility domains to the first mobility VLAN while selectively preventing access to other mobility VLANs across the two distinct mobility domains, wherein the first mobile unit retains an IP address assigned to the first mobile unit as part of its membership in the first mobility VLAN in both intra-subnet and inter-subnet roaming scenarios.

17. The computer system of claim 10, wherein the requests to add the second mobility switch and the second access point device as members of the first mobility VLAN each comprise a first mobility VLAN identifier and a requested action and wherein the memory stores further instructions that when executed by the processor cause the system to perform the operation of:
receiving a first response indicating acceptance of the request to add the second mobility switch as a member of the first mobility VLAN, wherein the first response comprises the first mobility VLAN identifier and a result code;
receiving a second response indicating acceptance of the request to add the second access point as a member of the first mobility VLAN, wherein the second response comprises the first mobility VLAN identifier and a second result code; and
adding the second access tunnel as a member of the first mobility VLAN, wherein adding the first mobility tunnel and the second access tunnel as members of the first mobility VLAN enables the first mobile unit to retain an IP address assigned to the first mobile unit as part of membership in the first mobility VLAN, the second mobility switch being part of a different subnet than the first mobility switch.

18. A non-transitory computer-storage medium having instructions stored thereon to carry out functionality of a mobility agent, such that the instructions, when carried out by a processing device, cause the processing device to perform the operations of:
establishing a first mobility tunnel between a first mobility switch and a second mobility switch within a mobility domain, the mobility domain providing connectivity over a wireless network for mobile units, the first mobility switch and the second mobility switch being network switches that process data traffic from one or more mobile units, the first mobility tunnel providing a connection for control messaging between the first and second mobility switches;
exchanging advertisements between the first mobility switch and the second mobility switch via the first mobility tunnel, the advertisements identifying mobility Virtual Local Area Networks (VLANs) for which each respective mobility switch acts as a mobility VLAN server, the first mobility switch acting as a first mobility VLAN server for a first mobility VLAN;
establishing a first access tunnel between the first mobility switch and a first access point device, the first access point device having a network connection to the first mobility switch, the first access point device providing wireless network connectivity to one or more mobile units;
establishing a second access tunnel between the second mobility switch and a second access point device, the second access point device having a network connection to the second mobility switch, the second access point device providing wireless network connectivity to one or more mobile units within the mobility domain;
receiving a request to add the second mobility switch as a member of the first mobility VLAN, the request received via the first mobility tunnel in response to a first mobile unit attempting to connect to the first mobility VLAN via the second mobility switch, the first mobile unit being a member of the first mobility VLAN;
receiving a request to add the second access point device as a member of the first mobility VLAN, the request received via the second access tunnel in response to the first mobile unit attempting to connect to the first mobility VLAN via the second access point device; and
adding the first mobility tunnel as a member of the first mobility VLAN to enable the second mobility switch to access the first mobility VLAN in order to handle traffic to and from the first mobile unit as part of the first mobility VLAN.

19. The non-transitory computer-storage medium of claim 18, wherein the wireless network further comprises at least two distinct mobility domains, the non-transitory computer-storage medium having further instructions stored thereon that, when carried out by the processing device, cause the processing device to perform the operation of:
exchanging advertisements between mobility switches across the two distinct mobility domains to provide access across the two distinct mobility domains to the first mobility VLAN while selectively preventing access to other mobility VLANs across the two distinct mobility domains, wherein the first mobile unit retains an Internet Protocol (IP) address assigned to the first mobile unit as part of its membership in the first mobility VLAN in both intra-subnet and inter-subnet roaming scenarios.

20. The non-transitory computer-storage medium of claim 18, wherein the requests to add the second mobility switch and the second access point device as members of the first mobility VLAN each comprise a first mobility VLAN identifier and a requested action, the non-transitory computer-storage medium having further instructions stored thereon that, when carried out by the processing device, cause the processing device to perform the operation of:
receiving a first response indicating acceptance of the request to add the second mobility switch as a member of the first mobility VLAN, wherein the first response comprises the first mobility VLAN identifier and a result code;

receiving a second response indicating acceptance of the request to add the second access point as a member of the first mobility VLAN, wherein the second response comprises the first mobility VLAN identifier and a second result code; and adding the second access tunnel as a member of the first mobility VLAN, wherein adding the first mobility tunnel and the second access tunnel as members of the first mobility VLAN enables the first mobile unit to retain an IP address assigned to the first mobile unit as part of membership in the first mobility VLAN, the second mobility switch being part of a different subnet than the first mobility switch.

* * * * *